United States Patent

Bartholomé et al.

[11] 3,886,187
[45] May 27, 1975

[54] CONTINUOUS MANUFACTURE OF PROPYLENE OXIDE FROM PROPYLENE CHLOROHYDRINE

[75] Inventors: Ernst Bartholomé, Heidelberg; Waldemar Koehler, Ludwigshafen; Guenter Stoeckelmann, Roxheim; Albert May, Ludwigshafen, all of Germany

[73] Assignee: Badische Aniline- & Soda-Fabrik Aktiengesellschaft, Ludwigshafen (Rhine), Germany

[22] Filed: Nov. 16, 1971

[21] Appl. No.: 199,319

[30] Foreign Application Priority Data
Nov. 16, 1970  Germany ......................... 2056198

[52] U.S. Cl. ............................................ 260/348.6
[51] Int. Cl. .............................................. C07d 1/04
[58] Field of Search ................................. 260/348.6

[56] References Cited
UNITED STATES PATENTS
1,996,638  4/1935  Britton et al. .................... 260/348.6
2,232,910  2/1951  Green et al. ..................... 260/348.6

FOREIGN PATENTS OR APPLICATIONS
4,210,204  6/1967  Japan ............................. 260/348.6

*Primary Examiner*—Norma S. Milestone
*Attorney, Agent, or Firm*—Johnston, Keil, Thompson & Shurtleff

[57] ABSTRACT

Continuous manufacture of propylene oxide by turbulent jet mixing of propylene chlorohydrin solution with aqueous alkali, mixing with steam to produce a two-phase mixture and a special working-up process following turbulent passage through a reaction zone with a short residence time. Propylene oxide is obtained in high yield and high space-time yield.

3 Claims, 1 Drawing Figure

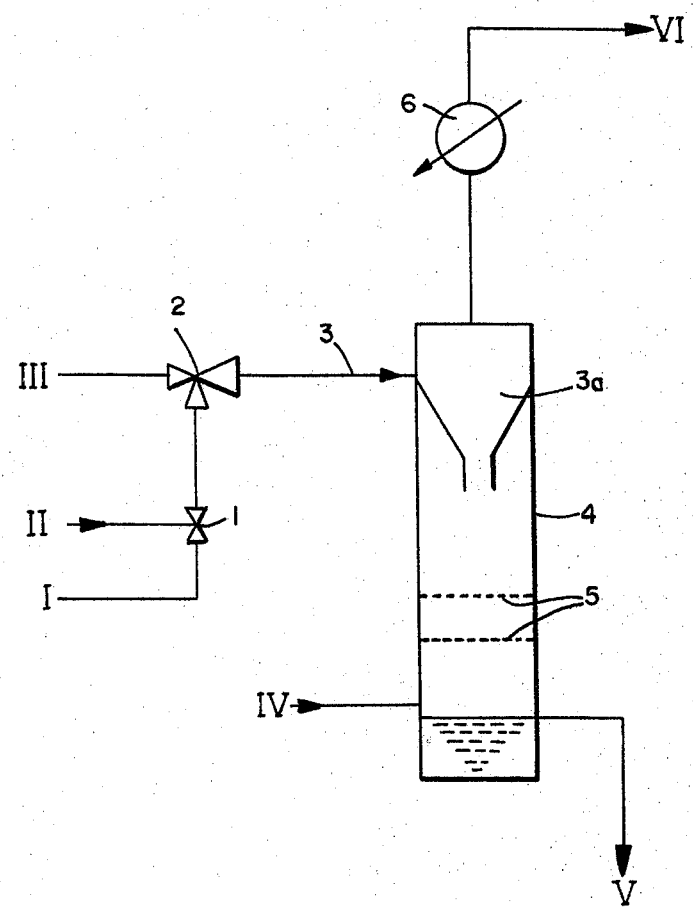

CONTINUOUS MANUFACTURE OF PROPYLENE OXIDE FROM PROPYLENE CHLOROHYDRINE

This invention relates to a process for the continuous manufacture of propylene oxide by saponification and propylene chlorohydrin with aqueous alkali.

Propylene chlorohydrin in aqueous solution can react with alkaline reagents to form propylene oxide according to equation (1):

(1) 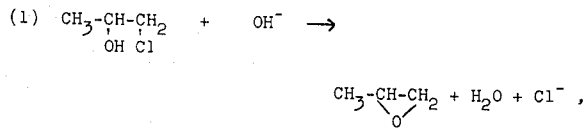

where the α-chlorohydrin is taken to represent both isomers of propylene chlorohydrin.

The main by-product during this oxide formation is propylene glycol, which can be formed from the chlorohydrin introduced, as shown by equation (2) illustrating the use of the α-isomer, or from the oxide product, as shown in equation (3):

(2) 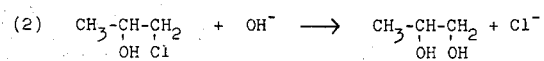

(3) 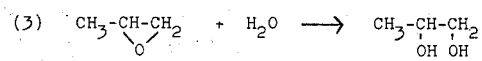

In order to avoid losses of yield due to the formation of byproducts and secondary products, the prior art demands exact pH control and removal of the propylene oxide product from the reaction mixture during the reaction. Good yields of propylene oxide have been obtained industrially only with milk of lime (see J. Myszkowski, A. Z. Zielinski and J. Raszkiewice, Chem. stosowana, Ser. A 10, 325 (1966), since the necessary pH control is readily effected due to the low solubility of calcium hydroxide and its weak basicity.

However, the use of milk of lime has technical and economical drawbacks. One such drawback is that extensive lime-slaking plant is necessary for the production of milk of lime, and another drawback is that the use of a solids suspension in a continuous process involves difficulties as regards metering, controlling the level of the liquid and keeping the apparatus clean. Moreover, the material discharged from the saponifier contains, in addition to calcium chloride and excess calcium hydroxide, further insoluble suspended materials in quantities depending on the purity of the lime used, which substances are lost in the waste water.

A wide variety of embodiments of apparatus for the saponification of chlorohydrin such as ethylene chlorohydrin or propylene chlorohydrin are described in the Fiat Report (R. M. Goepp et al., "The Manufacture of Ethylene oxide via Chlorohydrination of Ethylene," Fiat Final Report, No. 874, June 5, 1947).

Usually, the aqueous chlorohydrin solution is mixed with milk of lime and passed through a reactor which is provided with baffles to prevent backmixing. Live steam is passed through the liquid in the reactor to entrain the oxide formed. A major portion of the steam is then condensed in a dephlegmator and returned to the reaction mixture.

Japanese Pat. No. 13,819 describes another type of reactor in which a sieve is used to improve the distribution of the steam passed into the liquid.

The reactors described in the literature for the saponification reaction are usually cross-flow reactors in which large quantities of steam are introduced at points where the oxide has already been substantially or virtually completely removed. This means that the steam consumption is very high. Furthermore, large quantities of water are removed from the reaction chamber with the oxide product and this leads to an increase in the cost of distillation when the product is subsequently worked up to anhydrous propylene oxide. If a portion of the steam is recycled to the reactor in the form of condensate, the increased amount of liquid thus present constitutes a marked loss of capacity.

Attempts to combine the saponification to the oxide and its concentration by distillation have also been described (see P. P. McClellan, "Manufacture and Use of Ethylene Oxide and Glycol" Ind. Eng. Chem. 42, 12 (1950,) 2402–7). According to Japanese patent application 11, 724/67 (1963) a reactor carrying at its top a distilling column fitted with a reflux condenser produces propylene oxide having a reduced chlorine content. However, this process also requires large quantities of steam.

In U.S. Pat. No. 1,996,638 a tubular reactor (autoclave) for the saponification of a chlorohydrin with alkalis using residence times of between 5 seconds and 10 minutes is proposed. Despite the use of elevated pressure and temperatures of between 70° and 250°C, the yields produced by this process are unsatisfactory.

It is an object of the invention to provide a simple procedure for the continuous saponification of propylene chlorohydrin to propylene oxide in which milk of lime, which is normally used as saponifying agent, can be replaced by alkaline compounds completely dissolved in water, in particular by caustic soda solution, whilst improved yields are obtained.

In accordance with the present invention these and other objects and advantages are achieved in a process for the continuous manufacture of propylene oxide by reacting an aqueous solution of propylene chlorohydrin with aqueous alkali and driving the propylene oxide product out of the reaction mixture, wherein a. the propylene chlorohydrin solution is mixed with the aqueous alkali by turbulent jet mixing in a mixing time of from 0.1 to 4 sec. and at a temperature of from 70° to 150°C, b. the liquid mixture is mixed with steam, at least one of the two components being present in a finely divided form, c. the resulting mist or foam comprising the two-phase steam/liquid mixture is passed through a reaction zone with a residence time of 0.1 to 1 sec. and at a temperature of 70° to 150°C, d. the liquid phase is separated from the propylene oxide laden steam phase, e. the steam phase is partially condensed and the condensate is combined with the previously separated liquid phase, f. the resulting liquid mixture is stripped with steam on at least one column plate and the stripping steam is combined with the steam upstream of the partial condensation stage, and g. the propylene oxide is recovered from the steam phase downstream of the partial condensation stage.

The aqueous alkali solution is preferably metered to the propylene chlorohydrin solution at such a rate that the pH of the discharged liquid mixture following the stripping stage is from 8 to 13 and preferably from 9 to 12.

A suitable alkaline component for the saponification is, for example, caustic soda, caustic potash, sodium carbonate solution or mixtures of these substances. In special cases mixtures of these alkalis with milk of lime may also be used. However, we prefer to use solutions consisting of alkali compounds completely dissolved in water. It is particularly advantageous to use sodium hydroxide solution. It is not necessary to use the alkaline compound in a pure form. Thus it is possible, for example, to use a cell liquor such as is produced in the electrolysis of alkali metal chloride and which contains 11 percent w/w of sodium hydroxide and 15 percent w/w of sodium chloride, without purifying said liquor before use.

The concentration of the reactants in aqueous solution may generally be varied within wide limits. Propylene chlorohydrin concentrations of from 1 to about 10 percent by weight have been found to be advantageous. The alkaline components are generally used in concentrations of from 2 to 15 mole per liter of solution. Where caustic soda is used, a solution having a concentration of up to 50 percent by weight may be used without detrimental effects. In general, the solutions used contain from 8 to 50 percent and in particular from 10 to 35 percent by weight of NaOH.

The process of the invention may be carried out in very different ways.

The propylene chlorohydrin solution and the alkali solution may be preheated separately and then mixed together in a suitable mixing device. Alternatively, the two solutions may be fed to the mixing device cold or only slightly preheated and then heated to the desired mixing temperature of from 70° to 150°C and preferably from 90° to 120°C during mixing. From the moment the temperature of the combined solutions exceeds 70°C the mixing time up to the moment at which the mixture is distributed in the steam phase must be at least 0.1 sec. but not more than 4 sec. Particularly advantageous mixing times are those between 0.5 and 2 sec. Particularly when very short mixing times are used is it convenient to preheat the feed stock solutions separately. Heating may be carried out either indirectly by heat exchange over hot surfaces or directly, for example by mixing in steam.

The vigorous mixing of the reaction solutions is most simply effected by turbulent jet mixing, one of the solutions forming the turbulent liquid jet whilst the other is fed thereto (for details on jet mixing see B. Eck, "Technische Stroemungslehre," sixth Edition 1961, Springer-Verlag, pp. 166–176). Suitable mixing devices are, for example, mixing zones through which the liquids pass in a turbulent flow and which may be provided with one or more bottle-necks. Other examples are mixing nozzles. After the two reaction solutions have been throughly mixed in the specified temperature range and within the specified mixing time, the reaction mixture is vigorously mixed with steam after at least one of the two components has been finely dispersed by appropriate means. The ratio of steam to liquid mixture depends on the propylene chlorohydrin content of the reaction mixture. The minimum amount of steam required for each kg of propylene chlorohydrin is about 0.5 kg. Following the dispersion of the liquid and/or steam and the subsequent mixing of the two components, the temperature of the resulting two-phase mixture must be from 70° to 150° and preferably from 90° to 120°C. This temperature may be the same as the mixing temperature of the liquid mixture before dispersion or it can differ therefrom within the specified temperature range. If, when the steam is added, the reaction liquid is heated by condensation of a portion of the steam, the remaining portion of uncondensed steam must provide the aforementioned minimum quantity of about 0.5 kg per kg of propylene chlorohydrin. A higher steam/liquid ratio has a beneficial effect on the yield of propylene oxide but means increased steam consumption and higher distillation costs.

The vigorous mixing of the liquid phase with the steam phase provides extremely fine distribution of the components and thus affords a large area of contact between the steam and the liquid. In order to obtain such fine distribution, the liquid mixture and/or steam are finely dispersed by suitable means and the two phases are distributed in each other to form a mist and/or foam, the steam being added to the liquid and/or removed therefrom by evaporation.

When it is desired that steam be produced by evaporation from the liquid mixture, an appropriate pressure drop is necessary during dispersion of the liquid mixture and its distribution in the concurrently produced steam phase. The extent of the pressure drop depends on the pressure and temperature of the reaction liquid before relaxation thereof (the pressure drop) and on the amount of water to be vaporized and may be readily calculated for each case from the phase diagram of water. For example, in the case of a solution containing 5 percent by weight of propylene chlorohydrin, 25 g of water must be vaporized therefrom per kg of solution in order to obtain the minimum quantity of steam of 0.5 kg per kg of propylene chlorohydrin. If, before relaxation, the solution is at a pressure of 1 atmosphere absolute and at boiling temperature, the pressure must be reduced to 0.5 atmospheres absolute to achieve the above purpose.

The final pressure to which the pressure is reduced is a saturation vapor pressure of the relaxed liquid and thus depends on its temperature and the ratio of concentrations in the reaction zone. In the temperature range 70° to 150°C and preferably 90° to 120°C the final pressure is from about 0.3 to 4.6 atmospheres absolute and usually from 0.6 to 2.0 atmospheres absolute.

The pressure of the reaction solution before relaxation thereof may be higher than the saturation vapor pressure of the still unrelaxed reaction liquid and its upper limit is not determined by the process of the invention.

According to these various possibilities, the dispersing device may vary greatly in design. In the simplest case, one or more single-component nozzles are used and either the liquid is sprayed into the steam phase or the steam is blown into the liquid, or steam and liquid are passed together to the reaction zone through one or more multi-component nozzles. The fine distribution of both phases is effected by the turbulence occurring in the reaction zone. For the dispersion of added steam and its subsequent distribution in the liquid to form a foam it is particularly recommended to use a liquid jet nozzle such as is described in Canadian Pat. No. 831,399. Mechanical distribution of the liquid by centrifugal forces, for example using an atomizer disc, is also possible. Dispersion and mixing of the phases may also be effected by turbulence of flow, e.g. in a mixing zone.

The finely distributed steam/liquid mixture must pass through a reaction zone in a turbulent flow in the specified temperature range and with a residence time of from 0.1 to 1 sec.

This reaction zone may have a wide variety of forms. In the simplest case it is a reaction tube through which the two-phase reaction mixture flows turbulently in the form of a mist and/or foam. If the liquid mixture is atomized through nozzles or on an atomizer disc, the reaction zone may be in the form of a tower.

The intimate distribution of the two phases in each other, i.e. the provision of a large area of contact, and the turbulent flow of the phases provide good material transfer between the two phases. As a result, the volatile propylene oxide formed is rapidly removed from the reaction liquid and the formation of glycol is restricted thereby.

After passing through the reaction zone under the specified conditions, the steam and liquid phases must be separated from each other. This is most simply brought about by passing the two-phase steam/liquid stream to a calming chamber having a cross-section larger than that of the reaction zone. For rapid separation of the phases it is particularly recommended to pass the two-phase stream to a tengential-flow separator, in which the liquid flows off at the bottom and the propylene oxide laden steam escapes at the top.

In order to remove final traces of propylene oxide from the reaction liquid and the prevent further reaction thereof to glycol, the liquid leaving the phase-separating means is stripped with steam on at least one column plate. The amount of steam required for this purpose is small and depends on the amount of liquid to be treated and on the steam valocity required to obtain good results from one column plate. For example 1 kg of steam per 100 kg of liquid is adequate. The column plate may be, for example, a sieve plate or a bubble-cap tray, or a packing may be used provided it has the effect of at least one column plate.

The partial condensation of the propylene oxide laden steam is conveniently carried out in a dephlegmator and is intended to prevent residues of unreacted propylene chlorohydrin, in particular the more slowly saponifying β-chlorohydrin, from being entrained with the propylene oxide. The condensed chlorohydrin is returned to the reaction liquid together with the partial condensate, where it can saponify to propylene oxide which is recovered by the stripping steam. The latter is also passed to the dephlegmator so that all of the propylene oxide leaves the reactor via the dephlegmator.

To ensure that the entrained residues of propylene chlorohydrin can condense, the temperature used for the partial condensation must be sufficiently low. On the other hand, if the condensation temperature is too low, too much propylene oxide will be condensed. This quantity of propylene oxide will then return to the alkaline reaction liquid with the partial condensate and will be liable to react further to form the glycol. However, the temperature may be selected such that no appreciable amount of propylene chlorohydrin remains in the steam phase whilst the loss of yield due to the formation of glycol from partially condensed propylene oxide is at a minimum. The optimum temperatur largely depends on the propylene oxide content of the steam to be dephlegmated and may be readily determined in each case. If, for example, the steam to be dephlegmated contains 1 kg of propylene oxide per kg of steam, the dephlegmation temperature can be from 60° to 90°C.

The hot liquid stripped with steam contains a small amount of glycol formed as a by-product or secondary product. This liquid is conveniently used for at least partial preheating of the feedstock solutions. Depending on the ratio of added alkaline solution to the propylene chlorohydrin solution used, this hot liquid contains a slight excess of alkali reagent, this conveniently being such that the pH of the liquid is from 8 to 13 and preferably from 9 to 12.

Surprisingly, with the extremely short reaction times in the process of the invention the yield of propylene oxide is largely independent of the alkali excess, which makes reliable control of the process possible.

An embodiment of the process of the invention which is particularly advantageous in all respects is described below with reference to the apparatus diagrammatically illustrated in the accompanying FIGURE:

The preheated propylene chlorohydrin solution I and the preheated alkali solution II are mixed in a mixing nozzle 1 and the mixture is passed to a liquid jet nozzle 2 to which steam III is also passed. The steam/liquid jet leaving the injector nozzle 2 passes through a length of tube 3, which opens into a liquid separator 3a forming the top of a column 4. The liquid runs downwardly, is stripped with steam IV on two sieve plates 5, collects at the base of the column and flows off V. The steam phase is partially condensed in a dephlegmator 6 and the partial condensate flows down to sieve plates 5 whilst the uncondensed vapor mixture VI contains all of the propylene oxide formed and can then be worked up in the usual manner, for example by distillation, to give pure propylene oxide.

In the process of the invention, propylene chlorohydrin is saponified in yields of from 95 to more than 99 percent of theory and in extremely high space-time yields, due to the short reaction time. The reactor volume necessary is quite insignificant compared with the volume of the liquid separator and stripping apparatus.

Another advantage of the process is the extremely small amount of steam which is used to drive the propylene oxide out of the reaction liquid. In the saponification of a 5 percent w/w propylene chlorohydrin solution only about 1–2 kg of steam per kg of propylene oxide formed are used for said purpose.

Due to the extremely short reaction time in the process of the invention it is possible to conduct the process at no substantial loss of yield even when a relatively large excess of alkali is present, for example an excess of 10 percent based on the alkali consumed. This makes it possible to circumvent the technically and economically less satisfactory continuously saponification using a suspension of solid matter such as milk of lime.

Propylene oxide is an important intermediate in, for example, the manufacture of polyesters, polyurethane foams, aldehyde resins, emulsifiers, emulsion breakers, lubricants and brake fluide.

EXAMPLE 1

Using an apparatus as shown in the accompanying FIGURE, 200 l/hr of an aqueous propylene chlorohydrin solution I containing 50 g/l of propylene chlorohydrin and 20.3 g/l of hydrogen chloride is mixed with 17.6 kg/hr of a 50 percent w/w caustic soda solution II in the mixing nozzle 1.

The inlet temperature of the reaction solutions is 90°C and the residence time of the mixture in mixing nozzle 1 and the adjacent pipe as far as liquid jet nozzle 2 is 0.7 sec.

In jet nozzle 2 10 kg/hr of steam having a pressure of about 2 atmospheres gage and a temperature of 135°C are added. The finely distributed two-phase steam/liquid mixture passes through the reaction zone 3 with a residence time of 0.4 sec. and then enters the liquid separator of the column 4 at a liquid temperature of about 105°C. A further 3.5 kg/hr of saturated steam at a temperature of about 105°C are introduced below stipping plates 5.

The discharge V leaving column 4 at a temperature of 105°C has a pH of 12 and contains about 0.004 percent of glycol as by-product.

The condensation temperature in dephlegmator 6 is about 80°C. There is produced a vapor mixture VI containing 6,045 g of propylene oxide per hour. Based on the propylene chlorohydrin introduced the yield of propylene oxide is thus 98.5 percent of theory.

Of the 10 kg/hr condense, by which means the reaction liquid is heated from 90°C to its boiling temperature of 105°C. Based on the remaining steam and stripping steam IV, the steam consumption is 1.24 kg/kg of propylene oxide.

EXAMPLE 2

Using the same apparatus as in Example 1, 200 l/hr of an aqueous propylene chlorohydrin solution containing 50 g/l of propylene chlorohydrin and 20.3 g/l of hydrogen chloride is reacted with 76.5 kg/hr of so-called cell liquor containing 11.5 percent by weight of sodium hydroxide and 14.8 percent by weight of sodium chloride. The inlet temperature of the reaction solution is 90°C and the residence time between mixing nozzle 1 and liquid jet nozzle 2 is 0.55 sec.

Steam is fed to liquid jet nozzle 2 at a rate of 11.6 kg/hr. The pressure and temperature of this steam, the residence time in the reaction zone, the liquid temperature downstream of the reaction zone, the amount of stripping steam IV, its temperature and the temperature of condensation in the dephlegmator are all the same as in Example 1. The discharge from the column 4 has a pH of 11.5 and contains about 0.003 percent of glycol as by-product.

The vapor mixture IV contains 6,030 g/hr of propylene oxide. Thus the yield is 98.2 percent of theory based on the propylene chlorohydrin introduced.

The consumption of steam not including that required for heating the reaction liquid to its boiling temperature is 1.23 kg of steam per kg of propylene oxide.

EXAMPLE 3

Using the same apparatus as in Example 1, 200 l/hr of an aqueous propylene chlorohydrin solution containg 50 g/l of propylene chlorohydrin and 20.3 g/l of hydrogen chloride are mixed with 17.6 kg/hr of a 50 percent w/w caustic soda solution in the mixing nozzle 1. Both solutions are preheated at 90°C and the residence time between mixing nozzle 1 and injector nozzle 2 is 0.7 sec.

In injector nozzle 2 21.5 kg/hr of steam at a pressure of about 2 atmospheres gage and a temperature of 135°C are introduced. The residence time in the reaction zone 3 is 0.1 sec. and the temperature of the liquid entering the liquid separator is about 105°C. Below the stripping plates 5 there are introduced 5 kg/hr or saturated steam at a temperature of about 105°C. The discharge V has a pH of 12 and contains 0.002 percent of glycol as by-product.

The condensation temperature in dephlegmator 6 is about 70°C. There is produced a vapor mixture VI containing 6,080 g/hr of propylene oxide, equivalent to a yield of 99.1 percent of theory.

The steam consumption not including the steam required for heating up the liquid is 3.37 kg/kg of propylene oxide.

EXAMPLE 4

Using the same apparatus as in Example 1 to 3, 200 l/hr of an aqueous propylene chlorohydrin solution containing 50 g/l of propylene chlorohydrin and 20.3 g/l of hydrogen chloride (solution I) and 17.6 kg/hr of a 50 percent w/w caustic soda solution (solution II) are separately preheated to about 115°C under a pressure of about 3 atmospheres gage and then mixed in the mixing nozzle 1. Instead of injector nozzle 2 used in the previous Examples, a single-component nozzle is used as dispersing means. The residence time between mixing nozzle 1 and dispersing means 2 is 0.7 sec., at which point the pressure of the mixture before entering the single-component nozzle is 1.9 atmospheres gage and its temperature has risen to 121°C due to the heat of neutralization liberated in mixing nozzle 1 on account of the neutralization of the hydrogen chloride. In the single-component nozzle the reaction liquid is relaxed to atmospheric pressure with the generation of steam.

After a residence time of 0.3 sec. in tube 3, the steam/liquid mixture enters liquid separator 3a of column 4 at a liquid temperatur of 105°C. Below the stripping plates 5 there are introduced 3.5 kg/hr of saturated steam at a temperature of about 105°C.

The discharge V from the column 4 has a pH of 11.5 and contains about 0.004 percent of glycol as by-product.

At a condensation temperature in the dephlegmator 6 of about 75°C there is produced a vapor mixture VI containing 6,060 g of propylene oxide per hour. Based on the propylene chlorohydrin introduced, the yield of propylene oxide is 98.7 percent of theory.

We claim:

1. In a process for the continuous manufacture of propylene oxide by reacting a hot aqueous solution of propylene chlorohydrin with hot aqueous alkali, at a reaction temperature of from 70° to 150° C.; stripping the reaction mixture by means of steam; and recovering propylene oxide from the steam phase, the improvement which comprises:
   a. mixing the aqueous chlorohydrin with an aqueous alkali solution within 0.1 to 4 seconds by turbulent jet mixing at from 70° to 150°C.
   b. injecting the mixture immediately after mixing by means of steam into a tubular reaction zone at such a velocity, that the formed two-phase mixture of steam and liquid has a residence time in the reaction zone of from 0.1 to 1 seconds,
   c. conducting the reaction mixture from the reaction zone into the top of a separating column fitted with a dephlegmator, which is kept at such a temperature that only partial condensation occurs, stripping the liquid in the column with steam, which is introduced at the bottom of the column, and d. recovering propylene oxide from the vapor phase leaving the dephlegmator.

2. A process as claimed in claim 1, wherein the aqueous alkali used is caustic soda solution or caustic soda solution containing sodium chloride, the concentration of sodium hydroxide therein being from 8 to 50 percent by weight.

3. A process as claimed in claim 1, wherein the aqueous alkali is metered to the propylene chlorohydrin solution at such a rate that the pH of the liquid mixture downstream of the stripping stage is from 8 to 13.

* * * * *

UNITED STATES PATENT AND TRADEMARK OFFICE
CERTIFICATE OF CORRECTION

PATENT NO. : 3,886,187
DATED : May 27, 1975
INVENTOR(S) : BARTHOLOME et al

It is certified that error appears in the above-identified patent and that said Letters Patent are hereby corrected as shown below:

In the Title, delete "Chlorohydrine" and substitute --Chlorohydrin--

In Column 2, Line 36, delete "whilst" and substitute --while--

In Column 2, Line 44, delete "the aqueous alkali by turbulent..." and substitute --the aqueous alkali solution by turbulent...--

In Column 5, Line 32, delete "and the prevent further..." and substitute --and prevent further...--

In Column 5, Line 66, delete "temperatur" and substitute --temperature--

In Column 6, Line 62, delete "fluide" and substitute --fluid--

In Column 7, Line 16, delete "stipping" and substitute --stripping--

In Column 7, Line 60, delete "taing" and substitute --taining--

In Column 8, Line 10, delete "taing" and substitute --taining--

In Column 8, Line 37, delete "temperatur" and substitute --temperature--

Signed and Sealed this

Fourteenth Day of September 1976

[SEAL]

Attest:

RUTH C. MASON
Attesting Officer

C. MARSHALL DANN
Commissioner of Patents and Trademarks